United States Patent [19]

Locatelli

[11] 4,361,690

[45] Nov. 30, 1982

[54] NOVEL IMIDO/HYDROXYLATE ORGANOSILICON COPOLYMERS

[75] Inventor: Jena-Louis Locatelli, Vienne, France

[73] Assignee: Rhone-Poulenc Industries, Paris, France

[21] Appl. No.: 164,901

[22] Filed: Jul. 1, 1980

[30] Foreign Application Priority Data

Jul. 3, 1979 [FR] France ................................ 7917213

[51] Int. Cl.³ .............................................. C08G 77/06
[52] U.S. Cl. ...................................... 528/21; 528/26; 528/27; 528/28
[58] Field of Search ........................ 528/21, 26, 27, 28

[56] References Cited

U.S. PATENT DOCUMENTS 4,238,591 12/1980 Cassat et al. ........................... 528/26

*Primary Examiner*—Melvyn I. Marquis
*Attorney, Agent, or Firm*—Burns, Doane, Swecker & Mathis

[57] ABSTRACT

Strong, electrically insulating and thermally stable copolymers are prepared by copolymerizing an oligoimide or oliogoimide/polyamine, with an hydroxylated organosilicon comonomer, in the presence of a catalytic amount of an imidazole.

29 Claims, No Drawings

NOVEL IMIDO/HYDROXYLATE ORGANOSILICON COPOLYMERS

BACKGROUND OF THE INVENTION

1. Field of the Invention

The present invention relates to the preparation of novel heat-stable polymers comprising imide functions and an hydroxylated organosilicon compound, and, more especially, to the copolymeric reaction product between an oligoimide and an hydroxylated organosilicon comonomer in the presence of a catalytic amount of an imidazole.

2. Description of the Prior Art

It is known to this art that the polyimides are useful starting materials for the preparation of various heatstable resins. Thus, U.S. Pat. No. Re. 29,316, for example, describes certain thermosetting polymers obtained by reacting a bis-imide of an unsaturated dicarboxylic acid with a bis-primary diamine. And U.S. Pat. Nos. 4,111,919 and 4,173,595 feature thermosetting compositions consisting of a bis-maleimide and N-vinyl-2-pyrolidone. Heat curing of these polymers results in a variety of heat-stable resins.

SUMMARY OF THE INVENTION

It has now been found, and which is a major object of the present invention, that novel improved polymers comprising imide functions and possessing valuable mechanical properties combined with excellent resistance to heat-ageing and to hydrolysis, are prepared by heating an imido compound and an hydroxylated organosilicon compound in the presence of a catalyst.

Briefly according to this invention, the subject imido polymers are prepared by reacting:

(A) An imido comonomer, which can be either:

(a) an oligoimide having the structural formula:

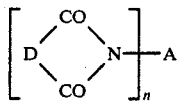   (I)

in which D represents a divalent radical selected from the group consisting of the radicals of the structural formulae:

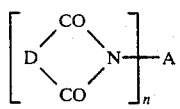

in which Y and Y', which are identical or different, each represent H, CH$_3$ or Cl and m is equal to 0 or 1, the symbol A represents an organic radical of valency n, which contains up to 50 carbon atoms, and n represents a number equal to at least 1.5 and equal to at most 5, or (b) a mixture of an oligoimide having the structural formula (I):

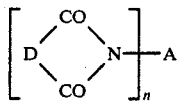   (I)

in which D, A and n are as defined above, with a polyamine of the structural formula (II):

$$G(NH_2)_z \qquad (II)$$

in which G is an organic radical of valency z and z is an integer equal to at least 2, or the product resulting from the reaction between the said oligoimide (I) with the said polyamine (II); with (B) An organosilicon compound comprising at least one hydroxyl group directly bonded to a silicon atom thereof; at a temperature of from about 50° C. to 300° C., in the presence of a catalytic amount of:

(C) An imidazole.

DETAILED DESCRIPTION OF THE INVENTION

More particularly according to this invention, preferred oligomides are the maleimides having the structural formula:

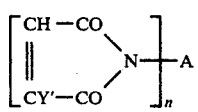   (III)

in which Y', A and n are as defined above.

In the aforenoted structural formulae (I) and (III), the symbol A advantageously is an alkylene radical having less than 13 carbon atoms, a phenylene radical, a cyclohexylene radical or one of the radicals of the formulae:

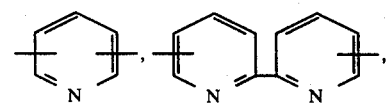

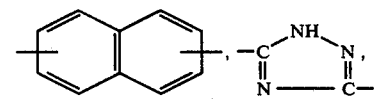

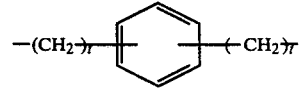

in which t represents an integer from 1 to 3; the symbol A can also represent a divalent radical having from 12 to 30 carbon atoms, which consists of phenylene or cyclohexylene radicals joined to one another by a single direct valence bond or via an inert hetero atom or linking group, such as —O—, —S—, an alkylene group having from 1 to 3 carbon atoms, —CO—, —SO$_2$—, —NR$_1$—, —N=N—, —CONH—, —P(O)—R$_1$—, —CONH—X—NHCO—,

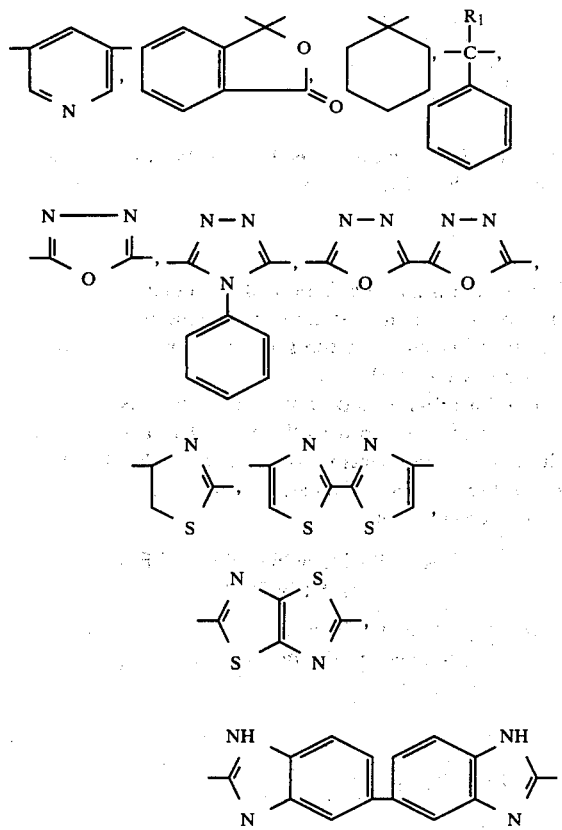

in which $R_1$ represents a hydrogen atom, an alkyl radical having from 1 to 4 carbon atoms, a phenyl radical or a cyclohexyl radical and X represents an alkylene radical having less than 13 carbon atoms. Moreover, the various phenylene or cyclohexylene radicals can be substituted by groups such as $CH_3$ and $OCH_3$ or by a chlorine atom.

The symbol A can also represent a radical containing up to 50 carbon atoms and having from 3 to 5 free valencies, it being possible for the said radical to consist of a naphthalene, pyridine or triazine nucleus, or a benzene nucleus which can be substituted by one or three methyl groups, or of several benzene nuclei joined to one another by an inert hetero atom or linking group which can be one of those indicated above or also

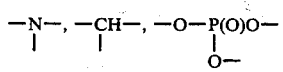

Finally, the symbol A too can represent a linear or branched chain alkyl or alkenyl radical which can contain up to 18 carbon atoms, a cycloalkyl radical containing 5 or 6 carbon atoms in the ring, a monocyclic or bicyclic aryl radical or an alkylaryl or aralkyl radical, containing up to 18 carbon atoms, one of the radicals:

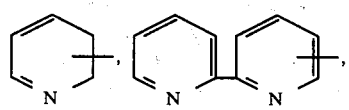

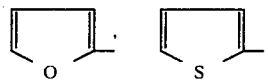

or a monovalent radical consisting of a phenyl radical and a phenylene radical joined to one another by a single direct valence bond or by an inert hetero atom or linking group, such as —O—, —S—, an alkylene radical having from 1 to 3 carbon atoms, —CO—, —$SO_2$—, —$NR_1$—, —N=N—, —CONH—, —COO— or —$COOR_1$, in which $R_1$ is as defined above. Moreover, these various radicals can be substituted by atoms, radicals or groups such as F, Cl, $CH_3$, $OCH_3$, $OC_2H_5$, OH, $NO_2$, —COOH, —NH—$COCH_3$,

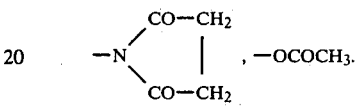

It will thus be apparent that the preferred maleimide according to the present invention can either be a specific individual polymaleimide or a mixture of maleimides bearing different functional groups. In the particular case in which a mixture comprising a monomaleimide is employed, the proportion of the latter in the mixture is preferably such that the number of maleimide groups provided by the monomaleimide does not represent more than 30% of the total number of maleimide groups involved in the reaction.

Exemplary of the maleimides of the formula (III) are the bis-imides, such as, for example: N,N'-ethylene-bis-maleimide, N,N'-hexamethylene-bis-maleimide, N,N'meta-phenylene-bis-maleimide, N,N'-parapheny-lene-bis-maleimide, N,N'-4,4'-biphenylene-bis-maleimide, N,N'-4,4'-diphenylmethane-bis-maleimide, N,N'-4,4'-(diphenyl ether)-bis-maleimide, N,N'-4,4'-(diphenyl sulfide)-bis-maleimide, N,N'-4,4'-diphenyl-sulfone-bis-maleimide, N,N'-4,4'-dicyclohexylmethane-bis-maleimide, N,N'-α,α'-4,4'-dimethylenecyclohexane-bis-maleimide, N,N'-meta-xylylene-bis-maleimide, N,N'-para-xylylene-bis-maleimide, N,N'-4,4'(1,1-diphenylcyclohexane)-bis-maleimide, N,N'-4,4'-diphenylmethane-bis-chloromaleimide, N,N'-4,4'-(1,1-diphenylpropane)-bis-maleimide, N,N'-4,4'-(1,1,1-triphenylethane)-bis-maleimide, N,N'-4,4'-triphenylmethane-bis-maleimide, N,N'-3,5-(1,2,4-triazole)-bis-maleimide, N,N'-dodeca-methylene-bis-maleimide, N,N'-(2,2,4-trimethylhex-amethylene)-bis-maleimide, N,N'-4,4'-diphenylme-thane-bis-citraconimide, 1,2-bis-(2-maleimidoethoxy)e-thane, 1,3-bis-3-maleimidopropoxy)-propane, N,N'-4,4'-benzophenone-bis-maleimide, N,N'-pyridine-2,6-diyl-bis-maleimide, N,N'-1,5-naphthylene-bis-maleimide, N,N'-1,4-cyclohexylene-bis-maleimide, N,N'-1,3-(5-methyl-phenylene)-bis-maleimide and N,N'-1,3-(5-methoxyphenylene)-bis-maleimide.

These bis-imides can be prepared utilizing those methods described in U.S. Pat. No. 3,018,290 and British Pat. No. 1,137,592.

Specific examples of exemplary mono-maleimides are N-phenyl-maleimide, N-phenyl-methyl-maleimide, N-phenylchloromaleimide, N-p-chlorophenyl-maleimide, N-p-methoxyphenylmaleimide, N-p-methylphenyl-maleimide, N-p-nitrophenyl-maleimide, N-p-phenox-yphenyl-maleimide, N-p-phenylaminophenyl-maleimide, N-p-phenoxycarbonylphenyl-maleimide, 1-maleimido-4-acetoxysuccinimido-benzene, 4-maleimido-4'-acetodysuccinimidodiphenylmethane, 4-maleimido-4'-acetoxysuccinimido-diphenyl ether, 4-maleimido-4'acetamido-diphenyl ether, 2-maleimido-6-acetamido-pyridine, 4-maleimido-4'-acetamido-diphenylmethane and N-p-phenylcarbonylphenyl-maleimide.

Such mono-imides can be prepared utilizing the method described in U.S. Pat. No. 2,444,536 for the preparation of N-aryl-maleimides.

Also exemplary of the maleimides (III) are the oligomers bearing imide groups, having the structural formula:

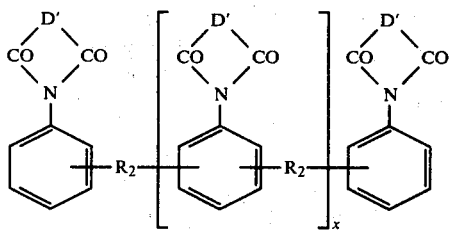

in which x represents a number ranging from about 0.1 to 2, the symbol $R_2$ represents a divalent hydrocarbon radical having from 1 to 8 carbon atoms, which is derived from an aldehyde or a ketone of the general formula:

$$O=R_2$$

in which the oxygen atom is bonded to a carbon atom of the radical $R_2$, and the symbol D' represents a divalent organic radical possessing from 2 to 24 carbon atoms, the free valencies of which being borne by adjacent carbon atoms and which is derived from an internal anhydride having the structural formula

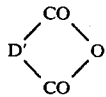

a proportion of at least about 60% of the radicals D' representing a radical of the formula:

in which the symbol Y is as defined above, and it being possible for any remaining radicals D' to represent, in particular, an alkylene, cycloalkylene or carbocylic or heterocyclic aromatic radical. The preparation of these oligomers bearing imide groups is described in British Pat. No. 1,348,077.

As regards the polyamine of the general formula $G(NH_2)_z$, a bis-primary diamine of the general formula: $H_2N-Q-NH_2$ (IV), in which the symbol Q can represent one of the divalent radicals represented by the symbol A, is preferred.

Exemplary of the polyamines which are representative according to the invention are: 4,4'-diaminodicyclohexylmethane, 1,4-diaminocyclohexane, 2,6-diaminopyridine, metaphenylenediamine, para-phenylenediamine, 4,4'-diaminodiphenylmethane, 2,2-bis-(4-aminophenyl)-propane, benzidine, 4,4'-diaminodiphenyl ether, 4,4'-diamino-diphenyl sulfide, 4,4'-diaminodiphenylsulfone, bis-(4-aminophenyl)-methylphosphine oxide, bis-(4-amino-phenyl)-phenylphosphine oxide, N,N-(4-aminophenyl)-methylamine, 1,5-diaminonaphthalene, meta-xylylene-diamine, para-xylylenediamine, 1,1-bis-(para-amine-phenyl)-phthalane, hexamethylenediamine, 6,6'-diamino-2'2-bipyridyl, 4,4'-diaminobenzophenone, 4,4'-diaminoazobenzene, bis-(4-aminophenyl)-phenylmethane, 1,1-bis-(4-aminophenyl)-cyclohexane, 1,1-bis-(4-amino-3-methylphenyl)-cyclohexane, 2,5-bis-(m-aminophenyl)-1,3,4-oxadiazole, 2,5-bis-(p-aminophenyl)-1,3,4-oxadiazole, 2,5-bis-(m-aminophenyl)-thiazolo(4,5-d)thiazole, 5,5'-bis-(m-aminophenyl)-2,2'-bis-(1,3,4-oxadiazolyl), 4,4'-bis-(p-aminophenyl)-2,2'-bithiazole, m-bis-[4-(p-aminophenyl)-thiazol-2-yl]-benzene, 2,2'-bis-(m-aminophenyl)-5,5'-bibenzimidazole, 4,4'-diaminobenzanilide, 4-amino-phenyl 4'-aminobenzoate, N,N'-bis-(4-aminobenzoyl)-p-phenylenediamine, 3,5-bis-(m-aminophenyl)-4-phenyl-1,2,4-triazole, 4,4'-[N,N'-bis-(p-aminobenzoyl)-diamino]-diphenylmethane, p-bis-(4-aminophenoxycarbonyl)-benzene, p-bis-(4-aminophenoxy)-benzene, 3,5-diamino-1,2,4-triazole, 1,1-bis-(4-aminophenyl)-1-phenylethane, 3,5-bis-(4-aminophenyl)-pyridine, 1,2,4-triaminobenzene, 1,3,5-triaminobenzene, 2,4,6-triaminotoluene, 2,4,6-triamino-1,3,5-trimethylbenzene, 1,3,7-triaminonaphthalene, 2,4,4'-triaminobiphenyl, 2,4,6-triaminopyridine, 2,4,4'-triaminodiphenyl ether, 2,4,4'-triaminodiphenylmethane, 2,4,4'-triaminodiphenylsulfone, 2,4,4'-triaminobenzophenone, 2,4,4'-triamino-3-methyldiphenylmethane, N,N,N-tris-(4-aminophenyl)-amine, tris-4-(aminophenyl)-methane, 4,4',4''-triaminotriphenyl orthophosphate, tris-(4-aminophenyl)-phosphine oxide, 3,5,4'-triaminobenzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3',4,4'-tetraaminodiphenyl ether, 3,3',4,4'-tetraaminodiphenylmethane, 3,3',4,4'-tetraaminodiphenylsulfone, 3,5-bis-(3,4-diaminophenyl)-pyridine and the oligomers of the average formula:

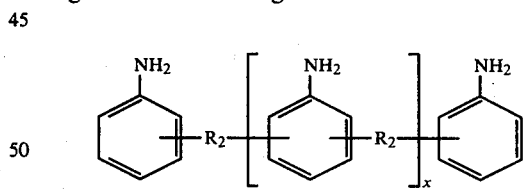

in which $R_2$ and x are as defined above. These oligomers bearing amine functions can be prepared in accordance with known processes, such as those which are described in U.S. Pat. No. 3,297,759, Canadian Pat. No. 823,286 and British Pat. No. 1,180,795.

The hydroxylated organosilicon compounds which fall within the scope of the invention are preferably known compounds corresponding to the following structural formula (V):

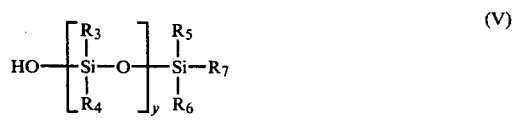

(V)

in which $R_3$, $R_4$, $R_5$, $R_6$ and $R_7$, which are identical or different, each represent a hydroxyl group or a group of the type —$OR_8$, in which $R_8$ is a linear or branched chain alkyl radical having from 1 to 6 carbon atoms or a phenyl radical; a hydrogen atom; a linear or branched chain alkyl radical which has from 1 to 6 carbon atoms and which is optionally substituted by one or more chlorine or fluorine atoms or by a group —CN; a linear or branched chain alkenyl radical having from 1 to 6 carbon atoms; or a phenyl radical which is optionally substituted by one or more alkyl and/or alkoxy radicals having from 1 to 4 carbon atoms or by one or more chlorine atoms; and y is an integer or fraction from 0 to 1,000.

For a specific organosilicon compound having the formula (V), y is always an integer in reality, but, as the compounds consistent herewith are polymeric in nature (when y is more than 1), it is rarely a single compound which is involved, but most frequently a mixture of compounds having the same chemical structure, but which differ in the number of recurring units in their molecule; this gives rise to an average value for y, which can either be an integer or a fraction thereof.

The hydroxylated organosilicon comonomers of the abovementioned type can be characterized by the ratio of the weight of the hydroxyl groups which they possess to the total weight of their molecule.

The organosilicon compounds which are preferred according to the present invention are the abovementioned compounds in which the weight ratio of the hydroxyl groups in the molecule is equal to at least 0.05% and preferably 0.1%.

Among the organosilicon compounds comprising such preferred group, most preferred are the compounds of the formula (V) in which $R_3$, $R_4$, $R_5$ and $R_6$, which are identical or different, each represent a linear or branched chain alkyl radical having from 1 to 6 carbon atoms, a linear or branched chain alkenyl radical having from 1 to 6 carbon atoms or a phenyl radical, $R_7$ represents a hydroxyl group and y is an integer or fraction from 0 to 250.

The organosilicon compounds are thus silanediols when y is equal to 0 or polysiloxanediols when y is different from 0.

For the preparation thereof, reference is made to the text by W. NOLL entitled *Chemistry and Technology of Silicones* (English translation from the German edition of 1968), published by Academic Press of New York.

Exemplary of the aforesaid most preferred organosilicon compounds are: diethylsilanediol, diphenylsilanediol, methylphenylsilanediol, 1,1,3,3-tetramethyldisiloxane-1,3-diol, 1,1-dimethyl-3,3-diphenyldisiloxane-1,3-diol, 1,3-dimethyl-1,3-diphenyldisiloxane-1,3-diol, 1,1,3,3,5,5-hexamethyltrisiloxane-1,5-diol, 1,1,3,3,5,5,7,7-octamethyltetrasiloxane-1,7-diol, 1,1,3,3,5,5,7,7,9,9-decamethylpentasiloxane-1,9-diol, 1,1,3,3,5,5,7,7,9,9,11,11-dodecamethylhexasiloxane-1,11-diol, 1,3,5,7,9-pentamethyl-1,3,5,7,9-pentaphenylpentasiloxane-1,9-diol and also their corresponding higher homologs.

The hydroxylated organosilicon compounds which too are very particularly suitable can also be mixtures of any two or more of the aforesaid compounds. Thus, commercially available hydroxylated polysiloxane resins or oils are utilized as a matter of convenience. These are, in particular, $\alpha,\omega$-dihydroxy polymethylpolysiloxane oils having from 0.2 to 0.3% by weight of hydroxyl groups (48 V 500 oil from Rhone-Poulenc) or 10 to 12% by weight of hydroxyl groups (48 V 50 oil from Rhone Poulenc) or $\alpha,\omega$-dihydroxy methylphenylpolysiloxane oils or resins having 4.5% to 5% by weight of hydroxyl groups (50606 oil from Rhone-Poulenc) or from 7.5 to 8.5% by weight of hydroxyl groups (50305 resin from Rhone-Poulenc); these commercial oils or resins are given purely by way of examples, but there exist many others which are equally suitable.

And consistent herewith, the term "oligoimide", the term "polyamine" and the term "hydroxylated organosilicon compound" encompass not only each individual compound of this type but also mixtures of oligoimides, of polyamines or of hydroxylated organosilicon compounds.

If the polymers according to the invention are prepared from an oligoimide (I) and an hydroxylated organo-silicon compound (V) (embodiment 1), the amounts of the reactants are selected such as to provide a weight ratio:

$$\frac{\text{hydroxylated organosilicon compound}}{\text{oligoimide + hydroxylated organosilicon compound}}$$

of between 5% and 80%.

A weight ratio of between 10% and 50% is normally employed.

Another means for defining the relative proportions of oligoimide and hydroxylated organosilicon compound consists of indicating the ratio of the number of hydroxyl groups in the organosilicon compound to the number of imide groups in the oligoimide. In general, this ratio is between 0.003 and 10, and preferably is between 0.01 and 2.

If the polymers according to the invention are prepared from an oligoimide (I), a polyamine (II) and an hydroxylated organosilicon compound (V) (embodiment 2), the amounts of reactants employed are such as to provide a weight ratio:

$$\frac{\text{hydroxylated organosilicon compound}}{\text{oligoimide + polyamine + hydroxylated organosilicon compound}}$$

of between 5% and 80%. This weight ratio usually is between 10% and 50%.

If the relative proportions of the reactants are defined not by weight but in terms of their functional groups, the ratio of the number of hydroxyl groups in the hydroxylated organosilicon compound and the number of amine groups in the polyamine, on the one hand, to the number of imide groups in the oligoimide, on the other hand, is generally between 0.1 and 10, and preferably between 0.2 and 4.

In the case of embodiment 2, the proportions of the hydroxylated organosilicon compound to the polyamine are such that the ratio:

$$\frac{\text{number of hydroxyl groups}}{\text{number of amine groups}}$$

is between 0.005 and 40, and preferably is between 0.01 and 10.

Preferred imidazole derivatives (C) have the structural formula:

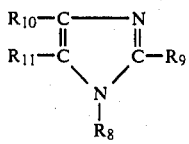

(VI)

in which $R_8$, $R_9$, $R_{10}$ and $R_{11}$, which are identical or different, each represent a hydrogen atom, an alkyl or alkoxy radical having from 1 to 20 carbon atoms, a vinyl radical, a phenyl radical or a nitro radical, it being possible for $R_{10}$ and $R_{11}$ to form, together with the carbon atom from which they depend, a single ring, such as, for example, a benzene ring.

Specific imidazole derivatives which are exemplary are imidazole or glyoxaline, 1-methylimidazole, 2-methylimidazole, 1,2-dimethylimidazole, 1-vinylimidazole, 1-vinyl-1-methylimidazole and benzimidazole.

The imidazole derivative (VI) is used in catalytic amounts. Depending upon the particular derivative used, amounts ranging from $1.10^{-4}$ mol to 0.1 mol per double bond of the oligoimide are preferably selected.

The process according to the invention can be carried out in bulk, by heating, at least until a homogeneous liquid is obtained, a mixture which, in embodiment 1, consists of an oligoimide (I) as defined above, an hydroxylated organo-silicon compound (V) and an imidazole derivative (VI), and, in embodiment 2 consists of an oligoimide (I), a polyamine (II), an hydroxylated organosilicon compound (V) and an imidazole derivative (VI). In the description which follows, this mixture will be designated by the expression "mixture of reactants". The mixture of reactants is advantageously homogenized before being heated. Typically, the reaction temperature ranges from 50° C. to 300° C.

The process according to the invention can also be carried out by heating the mixture of reactants in an organic diluent which is liquid over at least part of the range 50° C.-300° C. Among such diluents, exemplary are aromatic hydrocarbons, such as xylenes and toluene, halohydrocarbons, such as chlorobenzenes, ethers, such as dioxane, tetrahydrofuran and dibutyl ether, dimethylformamide, dimethylsulfoxide, N-methylpyrrolidone, N-vinylpyrrolidone, methylglycol and methyl ethyl ketone. The solutions or suspensions of polymers can be used as such for numerous purposes; it is also possible to isolate the polymers, for example, by filtration, if appropriate after precipitation using an organic diluent which is miscible with the solvent used. In this context, a hydrocarbon having a boiling point which does not substantially exceed 120° C. can advantageously be used.

Also in accordance with the invention, a thermosetting or prepolymer (P) having a softening point at a temperature below 250° C. is initially prepared (in general, this softening point is between 50° C. and 200° C.). This prepolymer can be obtained in bulk by heating the mixture of reactants at a temperature which typically is between 50° C. and 200° C., until a homogeneous or pasty product is obtained. The prepolymerization can also be carried out in suspension or in solution in a diluent which is liquid over at least part of the range 50° C.-200° C.

It must be noted that it is possible, in the case of embodiment 2, to form a prepolymer (PP) from all or part of the oligoimide and of the polyamine at a rate of 1.2 to 5 amide groups per amine group; this prepolymer (PP), which typically has a softening point of between 50° C. and 200° C., is then mixed with the hydroxylated organosilicon compound, if appropriate with the oligoimide and polyamine, and with the imidazole derivative, in order to obtain the prepolymer (P). It is also possible to homogenize beforehand a mixture of all or part of the oligoimide and of the hydroxylated organosilicon derivative, in the presence of the imidazole derivative, and then to add the polyamine, if appropriate with the remaining oligoimide and hydroxylated organosilicon derivative, in order to obtain the prepolymer (P).

The prepolymers (P) can be used in the form of a liquid mass, simple hot casting being all that is necessary for shaping and for producing molded articles. After cooling and grinding, they can also be used in the forms of powders which are markedly suitable for compression-molding operations, if appropriate in the presence of fillers in the form of powders, spherical beads, granules, fibers or flakes. The prepolymers (P) can be used to produce coverings, coatings and pre-impregnated intermediate articles, the reinforcement of which can consist of fibrous materials based on aluminium silicate or oxide or zirconium silicate or oxide, carbon, graphite, boron, asbestos or glass. These prepolymers (P) can also be used to produce cellular materials, or foams, after the incorporation therein of a pore-forming, or blowing agent, such as, for example, azodicarbonamide.

In a second stage, the prepolymers (P) can be cured by heating up to temperatures on the order of 350° C. and generally between 150° C. and 300° C.; complementary shaping can also be carried out during curing, if appropriate in vacuo or at a pressure greater than atmospheric pressure, it also being possible for these operations to be consecutive.

The process according to the invention, and the polymers which result therefrom are of value in those fields of industry which require materials possessing good mechanical and electrical properties and also high heat stability at temperatures of 200° C. to 300° C., and good dimensional stability in an aqueous medium.

The polymers can be used in the most diverse forms, such as molded shaped articles, laminates, paints, films, coverings, coatings and the like. Their applications in fields as varied as the electrical or mechanical industries and the fields of electrical insulation, of heating by radiation, convection or conduction, and of impregnated circuits, directly result from the advantages provided by the properties of these polymers.

In order to further illustrate the present invention and the advantages thereof, the following specific examples are given, it being understood that same are intended only as illustrative and in nowise limitative.

EXAMPLE 1

123 g of N,N'-4,4'-diphenylmethane-bis-maleimide and 37 g of diphenylsilanediol were introduced into a reactor which was equipped with a stirrer and degassing means and was placed in a thermostatically controlled oil bath at 155° C. This mixture was stirred for 30 minutes until a homogeneous mass was obtained. 0.224 g of imidazole in the form of a 12% strength aqueous solution was then added thereto. After stirring for 2 minutes, the mixture was degassed under a reduced pressure of 3 mm of mercury for 8 minutes.

The limpid mixture obtained was immediately cast into a 140×100×4 mm mold preheated to 150° C.

The entire assembly was heated at 150° C. for 3 hours and then at 200° C. for 21 hours.

After release from the mold, a homogeneous opaque plate was obtained, the properties of which were as follows:

Flexural strength (Sf) and flexural modulus (Mf) in accordance with ASTM Standard Specification D 790-63. Initial values:

| Sf | at 20° C. | 10.4 kg/mm² |
|---|---|---|
|  | at 200° C. | 7.8 kg/mm² |
| Mf | at 20° C. | 248 kg/mm² |
|  | at 200° C. | 157 kg/mm² |

After ageing at 200° C. for 550 hours:

| Sf | at 20° C. | 12.5 kg/mm² |
|---|---|---|
|  | at 200° C. | 7.8 kg/mm² |
| Mf | at 20° C. | 252 kg/mm² |
|  | at 200° C. | 178 kg/mm² |

Impact strength (Si) in accordance with French Standard Specification PT 51,017:

| at 20° C. | 5.1 kg cm/cm³ |
|---|---|

Weight gain after immersion for 100 hours in boiling water: 2.66%

EXAMPLES 2 to 9

Example 1 was repeated using different imidazole derivatives and varying the relative proportions of the various constituents.

The compositions and the properties of the resulting molded articles are summarized in Table 1.

EXAMPLE 10

45 g of diphenylsilanediol were introduced into the reactor described in Example 1 and were heated at 150° C. for 90 minutes. An oligomer containing 0.320% by weight of hydroxyl groups was obtained. Under stirring, 105 g of N,N'-4,4'-diphenylmethane-bis-maleimide were added thereto, which dissolved in 18 minutes, and 1.38 g of benzimidazole were then added. Heating was continued for 25 minutes at 155° C. under a pressure of 5 mm of mercury.

The resin obtained was cast into a mold preheated to 150° C. Curing was carried out at 150° C. for 2 hours 30 minutes and then at 200° C. for 21 hours.

A homogeneous plate was obtained, the properties of which were as follows: Initial measurements:

| at 20° C. | Sf | 8.3 kg/mm² |
|---|---|---|
|  | Mf | 191 kg/mm² |
|  | Si | 4.15 kg/mm² |
| at 200° C. | Sf | 6.3 kg/mm² |
|  | Mf | 128 kg/mm² |

After a residue time of 2,000 hours at 200° C.:

| at 20° C. | Sf | 9.7 kg/mm² |
|---|---|---|
|  | Mf | 234 kg/mm² |
| at 200° C. | Sf | 5.5 kg/mm² |
|  | Mf | 185 kg/mm² |

EXAMPLE 11

180 g of N,N'-4,4'-diphenylmethane-bis-maleimide, 20 g of an α,ω-dihydroxylic methylphenylpolysiloxane oil (0.324 OH group/100 g) and 2.254 g of benzimidazole were melted together at a temperature of about 170° C. The mixture was stirred for 10 minutes at this temperature and then degassed under reduced pressure for 10 minutes.

The resin obtained was cast into a molded preheated to 105° C. Same was baked at 150° C. for 1 hour 45 minutes and then at 200° C. for 22 hours. A homogeneous plate was obtained, the properties of which were as follows: Initial measurements:

| at 20° C. | Sf | 7.4 kg/mm² |
|---|---|---|
|  | Mf | 208 kg/mm² |
| at 200° C. | Sf | 5.65 kg/mm² |
|  | Mf | 141 kg/mm² |

After a residence time of 620 hours at 200° C.:

| at 20° C. | Sf | 7.8 kg/mm² |
|---|---|---|
|  | Mf | 208 kg/mm² |

EXAMPLE 12

The preceding example was repeated, but the polysiloxane oil being replaced by an equal amount of a branched methylphenylsiloxane resin containing 0.265 OH group/100 g, the melting point of which was 67.5° C.

The molded article, baked at 150° C. for 2 hours 30 minutes and at 200° C. for 22 hours, was homogeneous and had the following properties:

| at 20° C. | SF | 7.5 kg/mm² |
|---|---|---|
| at 200° C. | Sf | 5.7 kg/mm² |
| at 20° C. | Mf | 209 kg/mm² |
| at 200° C. | Mf | 158 kg/mm² |

EXAMPLE 13

A mixture consisting of 57.3 g of N,N'-4,4'-diphenylmethane-bis-maleimide, 12.7 g of 4,4'-diaminodiphenylmethane, 30 g of diphenylsilanediol and 0.725 g of benzimidazole was introduced into the reactor which was equipped with a stirrer and degassing means and was placed in a thermostatically controlled oil bath at 150° C. The mixture was stirred for 21 minutes; for the last 3 minutes, the reaction proceeded under a reduced pressure of 5 mm of mercury in order to degas the resin.

The limpid mixture obtained was immediately cast into a 140×100×5 mm mold preheated to 150° C. The entire assembly was heated at 150° C. for 2 hours and then at 200° C. for 22 hours. After release from the mold, an opaque and homogeneous plate was obtained; same was baked at 250° for 24 hours.

The properties thereof were as follows:

| at 20° C. | Sf | 11 kg/mm² |
|---|---|---|
|  | Mf | 135 kg/mm² |
| at 200° C. | Sf | 5.8 kg/mm² |
|  | Mf | 114 kg/mm². |

TABLE 1

| | Composition (weight in g) | | | | Mechanical Properties Initial | | | | |
| | | | | | at 20° C. | | | at 200° C. | |
| Example | Bis-imide | Silane-diol | Catalyst* | | Sf kg/mm² | Mf kg/mm² | Si kg cm/cm³ | Sf kg/mm² | Mf kg/mm |
| --- | --- | --- | --- | --- | --- | --- | --- | --- | --- |
| 2 | 62.4 | 37.6 | I | 0.115 | 10.0 | 183 | 3.9 | 4.75 | 118 |
| 3 | 90 | 10 | B | 1.180 | 9.9 | 276 | 5.1 | 7.3 | 201 |
| 4 | 76.8 | 23.2 | B | 2.198 | 9.9 | 237 | 4.8 | 7.4 | 174 |
| 5 | 76.8 | 23.2 | B | 0.975 | 9 | 245 | 3.4 | 6.1 | 133 |
| 6 | 70 | 30 | B | 0.920 | 8.9 | 190 | 4.1 | 5.9 | 136 |
| 7 | 62.4 | 37.6 | B | 0.788 | 8.3 | 196 | 3.6 | 4.55 | 102 |
| 8 | 62.4 | 37.6 | B | 2.370 | 8.6 | 163 | 5 | 5.6 | 115 |
| 9 | 62.4 | 37.6 | VI | 1.157 | 9.3 | 173 | | 5.6 | 101 |

| | Mechanical Properties After a residence time of 550 hours at 200° C. | | | | |
| | at 20° C. | | at 200° C. | | |
| Example | Sf kg/mm² | Mf kg/mm² | Sf kg/mm² | Mf kg/mm² | Δp** |
| --- | --- | --- | --- | --- | --- |
| 2 | 8.9 | 188 | 5.5 | 132 | 3.24 |
| 3 | 9.9 | 302 | | | 2.25 |
| 4 | 11.5 | 281 | 5.9 | 186 | 2.54 |
| 5 | | | | | 2.04 |
| 6 | 9.7 | 245 | 5.3 | 162 | |
| 7 | 9.2 | 224 | 4.05 | 125 | 1.87 |
| 8 | 9.9 | 199 | 5.1 | 128 | 2.15 |
| 9 | | | | | |

*B = benzimidazole
I = imidazole
VI = 1-vinylimidazole
**Δp = % variation in the weight of the sample, relative to the initial weight, after immersion in boiling water for 100 hours.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A process for the preparation of an imido copolymer comprising reacting
   (i) an imido monomer selected from the group consisting of:
   (ia) an oligoimide having the structural formula:

$$\left[ D \begin{matrix} CO \\ \diagdown \\ CO \end{matrix} \diagup N \right]_n - A \qquad (I)$$

in which D represents a divalent radical selected from the group consisting of the radicals of the structural formulae:

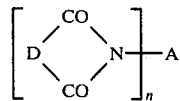

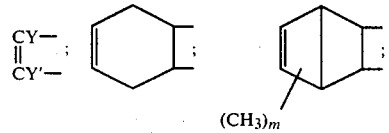

in which Y and Y', which are identical or different, each represent H, CH₃ or CL and m is equal to 0 or 1, the symbol A represents an organic radical of valency n, which contains up to 50 carbon atoms, and n represents a number equal to at least 1.5 and equal to at most 5;

(ib) a mixture of an oligoimide having the structural formula (I):

$$\left[ D \begin{matrix} CO \\ \diagdown \\ CO \end{matrix} \diagup N \right]_n - A \qquad (I)$$

in which D, A and n are as defined above, with a polyamine of the structural formula (II):

$$G(NH_2)_z \qquad (II)$$

in which G is an organic radical of valency z and z is an integer equal to at least 2; and (ic) the product of reaction between said oligoimide (I) and said polyamine (II); and (ii) an organosilicon comonomer comprising at least one hydroxyl group directly bonded to a silicon atom thereof, with said reacting occurring in the presence of a catalytic amount of an imidazole (iii) at a temperature ranging from about 50° C. to ranging from about 50° C. to 300° C. 300° C.

2. The process as defined by claim 1, wherein said imidazole (iii) has the structural formula:

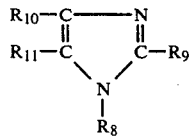

in which R₈, R₉, R₁₀ and R₁₁, which are identical or different, each represent a hydrogen atom, an alkyl or alkoxy radical having from 1 to 20 carbon atoms, a vinyl radical, a phenyl radical or a nitro radical, and further wherein $R_{10}$ and $R_{11}$, together with the carbon atoms from which they depend, may form a single ring.

3. The process as defined by claim 2, wherein said imidazole (iii) is selected from the group consisting of imidazole, glyoxaline, 1-methylimidazole, 2-methylimidazole, 1,2-dimethylimidazole, 1-vinylimidazole, 1-vinyl-1-methylimidazole and benzimidazole.

4. The process as defined by claim 1, wherein the imido monomer (i) and the organosilicon comonomer (ii) are reacted in proportions such that the ratio of the number of hydroxyl groups in said comonomer (ii) to the number of imide groups in the monomer (i) ranges from 0.003 to 10.

5. The process as defined by claim 4, wherein said ratio ranges from 0.01 to 2.

6. The process as defined by claim 1, wherein the imido monomer (i) comprises the mixture of polyamine and oligoimide (ib); the imido (i) and the organosilicon comonomer (ii) are reacted such that the ratio $$\frac{\text{number of hydroxyl groups} + \text{number of amine groups}}{\text{number of imide groups}}$$

ranges from 0.1 to 10, and the ratio $$\frac{\text{number of hydroxyl groups}}{\text{number of amine groups}}$$

ranges from 0.005 to 40.

7. The process as defined by claim 1, wherein the imidazole (iii) is present in an amount of $1.10^{-4}$ mols to 0.1 mole per double bond of the oligoimide.

8. The process as defined by claim 1, wherein the reaction is conducted in the presence of an inert organic diluent.

9. The process as defined by claim 1, comprising first prepolymerizing said comonomers at a temperature from 50° C. to 200° C., and thence curing the prepolymer which results at a temperature from 150° C. to 300° C.

10. The process as defined by claim 1, wherein the comonomers (ia) and (ii) are reacted.

11. The process as defined by claim 1, wherein the comonomers (ib) and (ii) are reacted.

12. The process as defined by claim 1, wherein the comonomers (ic) and (ii) are reacted.

13. The process as defined by claim 10, 11 or 12 wherein the oligoimide (I) is a maleimide having the structural formula:

$$\begin{bmatrix} CH-CO \\ \| \quad \quad \ \ \diagdown \\ \quad \quad \quad \quad N- \\ CY'-CO \diagup \end{bmatrix}_n A \quad (III)$$

in which Y' represents H, $CH_3$ or Cl, the symbol A represents an organic radical of valency n which contains up to 50 carbon atoms, and n represents a number equal to at least 1.5 but not greater than 5.

14. The process as defined by claim 13, wherein A is selected from the group consisting of an alkylene radical having less than 13 carbon atoms, a phenylene radical, a cyclohexylene radical, one of the radicals having the structural formulae:

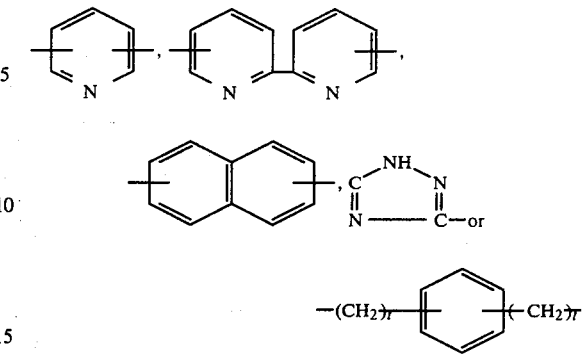

in which t is an integer from 1 to 3.

15. The process as defined by claim 13, wherein A is selected from the group consisting of a divalent radical having from 12 to 30 carbon atoms comprising phenylene or cyclohexylene radicals joined to one another by a single direct valence bond or via an inert hetero atom or linking group selected from the group consisting of —O—, —S—, an alkylene group having from 1 to 3 carbon atoms, —CO—, —SO$_2$—, —NR$_1$—, —N=N—, —CONH—, —P(O)—R$_1$—, —CONH—X—NHCO,

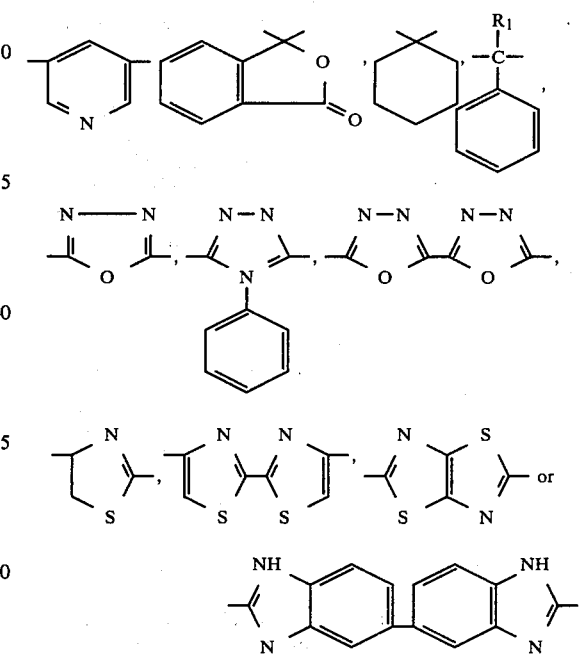

in which $R_1$ represents a hydrogen atom, an alkyl radical having from 1 to 4 carbon atoms, a phenyl radical or a cyclohexyl radical and X represents an alkylene radical having less than 13 carbon atoms.

16. The process as defined by claim 15, said phenylene or cyclohexylene radicals being substituted by at least one substituent selected from the group consisting of —$CH_3$, —$OCH_3$ and —Cl.

17. The process as defined by claim 13, wherein A comprises from 3 to 5 free valencies and a nucleus selected from the group consisting of naphthalene, pyridine, triazine, benzene, a one to three methyl group substituted such nucleus, or a plurality of benzene nuclei linked to one another by an inert hetero atom or linking group or by a radical having one of the formulae:

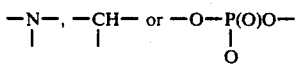

18. The process as defined by claim 13 wherein A is selected from the group consisting of a linear or branched chain alkyl or alkenyl radical containing up to 18 carbon atoms, a cycloalkyl radical containing 5 or 6 ring carbon atoms, a monocyclic or bicyclic aryl radical or an alkylaryl or aralkyl containing up to 18 carbon atoms, one of the radicals:

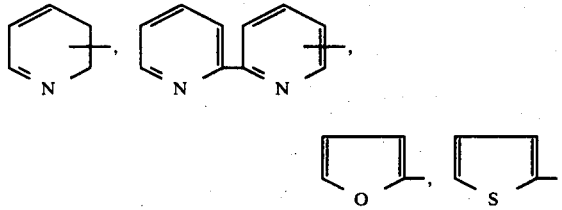

or a monovalent radical consisting of a phenyl radical and a phenylene radical linked to one another by a single direct valence bond or by an inert hereto atom or linking group selected from the group consisting of —O—, —S—, an alkylene radical having from 1 to 3 carbon atoms, —CO—, —SO$_2$—, —NR$_1$—, —N=N—, —CONH—, or —COO—, in which R$_1$ represents a hydrogen atom, an alkyl radical having from 1 to 4 carbon atoms, a phenyl radical or a cyclohexyl radical.

19. The process as defined by claim 18, wherein the radical is substituted by at least one substituent selected from the group consisting of F, Cl, CH$_3$, OCH$_3$, OC$_2$H$_5$, OH, NO$_2$, —COOH, —NH—COCH$_3$,

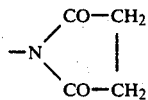

and —OCOCH$_3$.

20. The process as defined by claims 9, 10 or 11 wherein said oligoimide (I) is N,N'-4,4'diphenylmethane-bis-maleimide.

21. The process as defined by claim 13, wherein the polyamine (II) has the formula H$_2$N—Q—NH$_2$ in which Q represents an organic radical which contains up to 50 carbon atoms and has a valency equal to at least 1.5 but not greater than 5.

22. The process as defined by claim 10, 11 or 12 wherein said organosilicon comonomer (ii) has the structural formula:

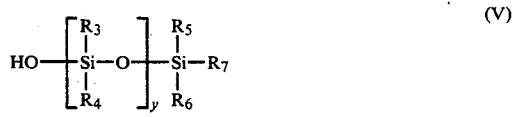

in which R$_3$, R$_4$, R$_5$, R$_6$ and R$_7$, which are identical or different, each represent a hydroxyl group or the group —OR$_8$, in which R$_8$ is a linear or branched chain alkyl radical having from 1 to 6 carbon atoms or a phenyl radical; a hydrogen atom; a linear or branched chain alkyl radical which has from 1 to 6 carbon atoms or such alkyl radical substituted by at least one chlorine or fluorine atom or by —CN; a linear or branched chain alkenyl radical having from 1 to 6 carbon atoms; or a substituted or unsubstituted phenyl radical, each such substituent being either an alkyl or alkoxy radical having from 1 to 4 carbon atoms, or a chlorine atom; and y is an integer or fraction from 0 to 1,000.

23. The process as defined by claim 22, wherein the formula (V) R$_3$, R$_4$, R$_5$ and R$_6$, which are identical or different, each represent a linear or branched chain alkyl radical having from 1 to 6 carbon atoms, a linear or branched chain alkenyl radical having from 1 to 6 carbon atoms or a phenyl radical, R$_7$ represents a hydroxyl group and y is an integer or fraction from 0 to 250.

24. The process as defined by claim 23, wherein said organosilicon comonomer is diphenylsilanediol.

25. The process as defined by claim 21 wherein the polyamine is 4,4'-diaminodiphenylmethane.

26. The imido copolymer formed by the process of claim 1, 2, 3, 4, 5, 6, 7, 9, 10, 11 or 12.

27. The imido copolymer formed by the process of claim 1 in thermosetting form.

28. The imido copolymer formed by the process of claim 1 in thermoset form.

29. A shaped article comprising the imido copolymer as defined by claim 27 or 28.

* * * * *